United States Patent [19]

Jeon

[11] Patent Number: 5,903,406
[45] Date of Patent: *May 11, 1999

[54] MAGNETIC TAPE RECORDING AND REPRODUCING APPARATUS FOR ANALOG AND DIGITAL COMBINED USE

[75] Inventor: Jin-kyu Jeon, Suwon, Rep. of Korea

[73] Assignee: Samsung Electronics Co., Ltd., Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/685,459

[22] Filed: Jul. 22, 1996

[30] Foreign Application Priority Data

Jul. 20, 1995 [KR] Rep. of Korea ........................ 95-21358

[51] Int. Cl.$^6$ .................................................. G11B 15/14
[52] U.S. Cl. .............................................. 360/64; 386/124
[58] Field of Search ................................. 360/64, 61, 65, 360/32; 386/72, 92, 67, 124

[56] References Cited

U.S. PATENT DOCUMENTS

| 4,949,173 | 8/1990 | Mitsuhashi | 348/143 |
| 5,335,125 | 8/1994 | Nakatsu et al. | 386/67 |
| 5,506,733 | 4/1996 | Kim et al. | 360/27 |
| 5,563,745 | 10/1996 | Kim | 360/64 X |
| 5,623,573 | 4/1997 | Strolle et al. | 386/92 |

*Primary Examiner*—Alan Faber
*Attorney, Agent, or Firm*—Sughrue, Mion, Zinn, Macpeak & Seas, PLLC

[57] ABSTRACT

An analog and digital combination recording and reproduction apparatus uses the existing head layout found in an analog recording and reproduction apparatus such as an existing VHS system, for recording and reproduction of both analog and digital signals on a magnetic tape. Using a video signal head or a hi-fi audio signal head for use in an extended play mode, digital video and audio signals are simultaneously recorded on tracks obtained by bisecting the standard play mode track width. Thus, the analog and digital signals can be recorded and reproduced without having additional heads for digital recording and reproduction, thereby providing a simple structure and minimizing costs.

11 Claims, 7 Drawing Sheets

2-HEAD RECORDING

MAGNETIC TAPE RECORDING AND REPRODUCING APPARATUS FOR ANALOG AND DIGITAL COMBINED USE

BACKGROUND OF THE INVENTION

The present invention relates to a recording and reproducing apparatus for analog and digital combined use, and more particularly, to an analog and digital combination recording and reproducing apparatus which can perform recording and reproduction of a digital signal using heads mounted in an existing analog recording and reproducing apparatus.

A recent trend in video cassette recorder (VCR) technology is the change from analog recording and reproduction systems to digital recording and reproduction systems. One reason for this trend is that a digital VCR can obtain much better picture quality. However, current broadcasting systems and video tapes are largely analog, thus analog systems cannot be replaced by digital systems instantaneously, and both analog and digital VCRs will coexist for a considerable time. Thus, there exists a need for an analog and digital combination recording and reproduction apparatus which is compatible with existing analog systems.

A typical analog and digital combination recording and reproduction apparatus includes heads, a recording circuit, and a reproduction circuit for digital recording and reproduction, as well as a separate set of heads and circuits for analog recording and reproduction. Such an apparatus switches between two systems via a switching portion to enable recording and reproduction of a digital or analog signal. However, by requiring additional heads and recording and reproduction circuits for the digital signal, such systems require a complicated structure and a high cost.

Another conventional approach divides the recording track into three "divided" tracks and uses two additional heads in order to interface with the three divided tracks. This recording and reproduction apparatus can share a recording and reproduction system in order to process digital or analog signals. However, this approach requires additional heads to cover the three divided tracks.

SUMMARY OF THE INVENTION

To solve the above problem, it is an object of the present invention to provide an analog and digital combination recording and reproduction apparatus which uses heads for analog recording and reproduction and alters the structure of a signal recording track, to thereby enable digital recording and reproduction.

To accomplish the above object of the present invention, one embodiment provides an analog and digital combination recording and reproduction apparatus which readjusts the positions and azimuths of the existing analog heads and uses these analog heads to record and read digital information in a track format that is appropriate for digital recordings.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawings.

Figure 1:
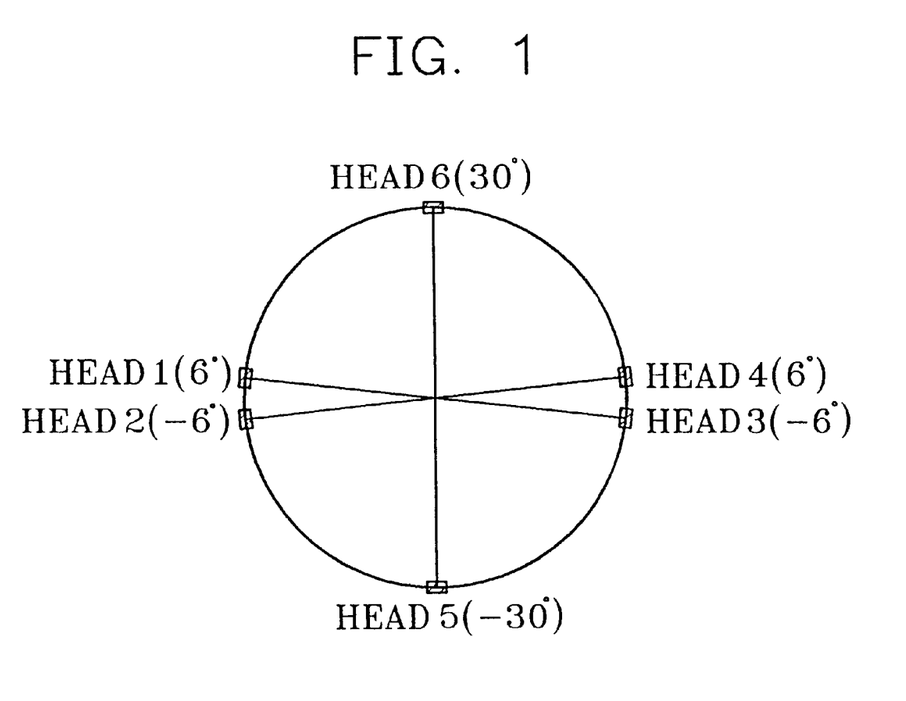
FIG. 1 shows the head layout for use in an analog and digital combination recording and reproduction apparatus according to the present invention.

FIG. 1 shows heads which are disposed in the form of a double azimuth according to the present invention. The arrangement of the heads shown in FIG. 1 is the same as that of an analog recording and reproduction apparatus according to the existing VHS standard. In FIG. 1, heads H1 and H3 are adapted for tracks each having a width of 58 $\mu$m and for recording and reproducing a video signal in the SP mode. Heads H2 and H4 are adapted for tracks each having a width of 19 $\mu$m and for recording and reproducing a video signal in the EP mode. Heads H5 and H6 are adapted for recording and reproducing a hi-fi audio signal. These heads have a predetermined azimuth angle according to a signal standard. The azimuth angle of the heads in the existing analog recording and reproduction apparatus are expressed in Table 1.

TABLE 1

| USE | HEAD # | AZIMUTH ANGLE |
| --- | --- | --- |
| SP MODE | HEAD1 | +6° |
| VIDEO HEAD (58$\mu$m) | HEAD3 | −6° |
| EP MODE | HEAD2 | −6° |
| VIDEO HEAD (19$\mu$m) | HEAD4 | +6° |
| AUDIO SIGNAL | HEAD5 | −30° |
| HEAD | HEAD6 | +30° |

Prior to explaining a method of recording and reproducing analog and digital signals using the above-described head structure, a track structure introduced in the present invention will be described below.

Figure 2A:
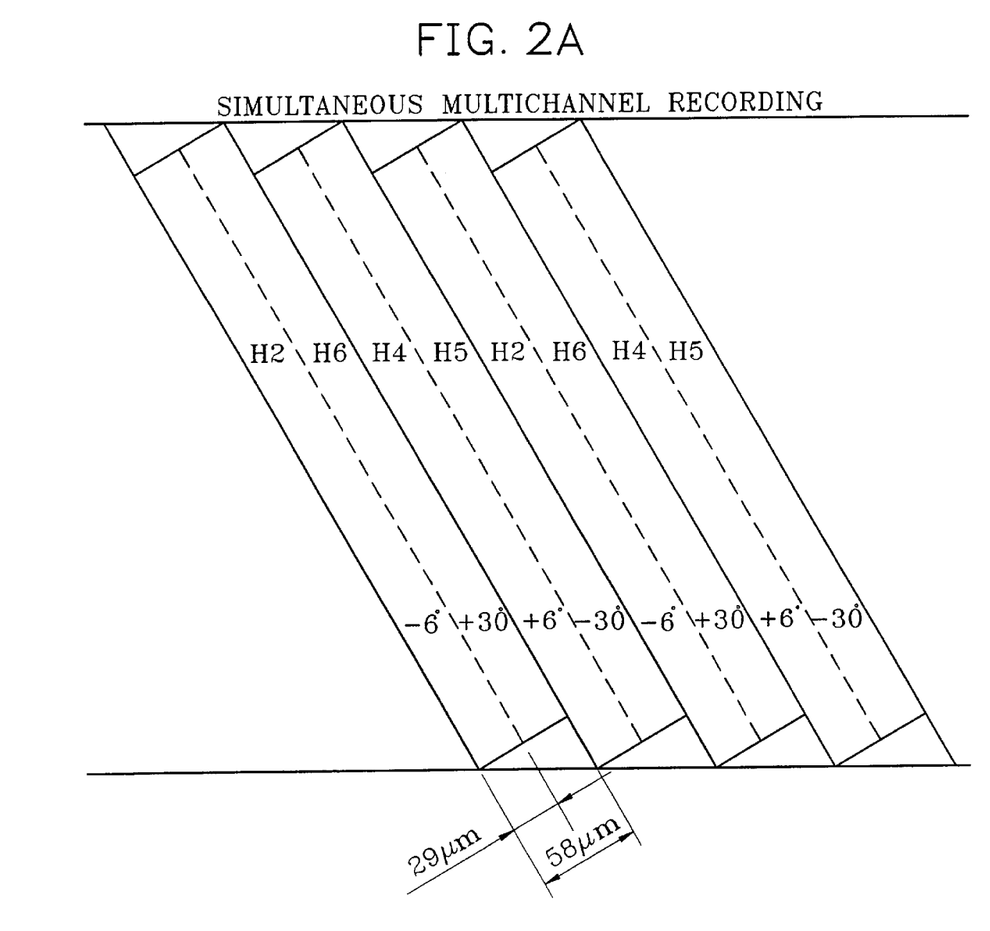
FIG. 2A is a view for explaining multichannel digital recording and reproduction in an analog and digital combination recording and reproduction apparatus according to the present invention.
Figure 2B:
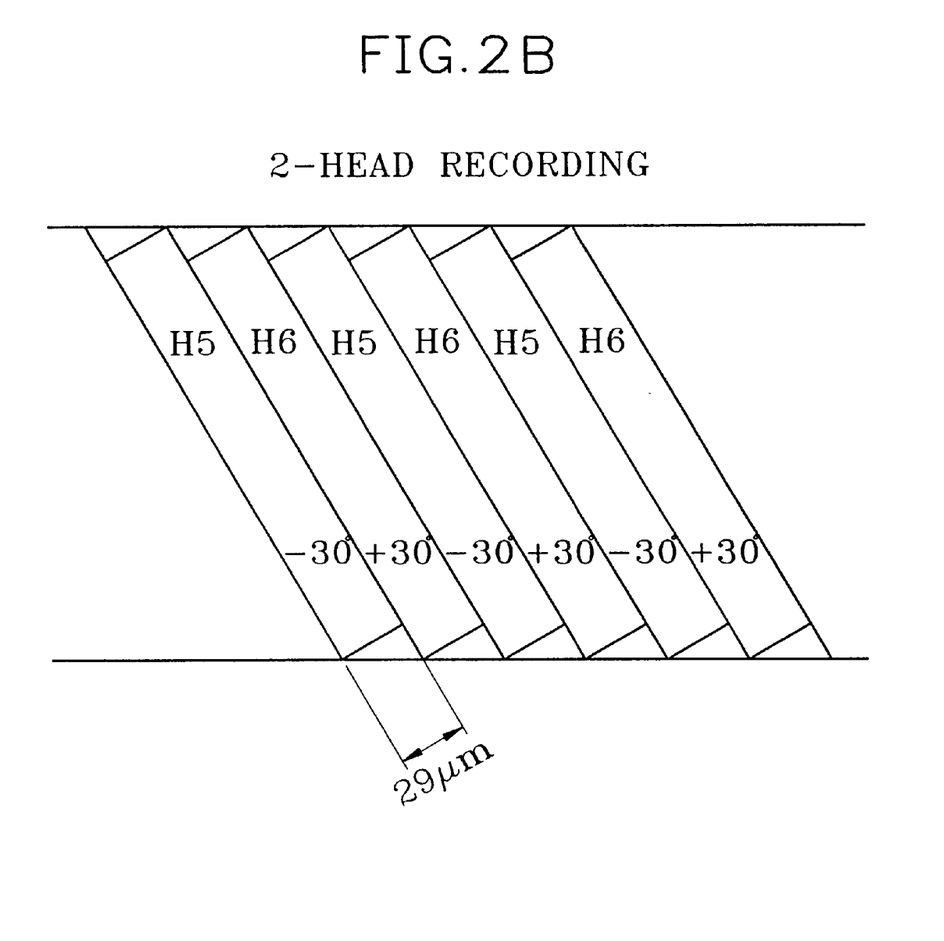
FIG. 2B is a view for explaining 2-head digital recording and reproduction in an analog and digital combination recording and reproduction apparatus according to the present invention.

FIGS. 2A and 2B are views showing track structures for digital recording and reproduction in an analog and digital combination recording and reproduction apparatus according to the present invention. FIG. 2A shows a track structure for a simultaneous multi-channel recording system, and FIG. 2B shows a track structure for a two-head recording system.

The track structure shown in FIG. 2A bisects a track having a width of 58 $\mu$m used in the SP mode of a VHS system, to record video and audio signals. Each 29 $\mu$m track shown in FIG. 2A has an azimuth angle different from the 3 adjacent tracks on either side. A signal is recorded or reproduced by a head corresponding to each azimuth angle. The 29 µm track on which a video signal is recorded, is scanned by heads H2 and H4 for the EP mode having an azimuth angle of ±6° and the 29 µm track on which an audio signal is recorded, is scanned by heads H5 and H6 for an audio signal having an azimuth angle of ±30°. Generally in a VHS system, the heads H2 and H4 for an EP mode video signal and the heads H5 and H6 for a hi-fi audio signal have a head width of about 28 µm, respectively. Thus, the 58 µm SP mode track can be used as two 29 µm tracks. Here, the step between the heads H2 and H6 or the heads H4 and H5 corresponding to each 29 µm track is controlled, and video and audio signals are simultaneously recorded on or reproduced from each 29 µm-width track, which is called a multichannel simultaneous recording and reproduction system. In such a multichannel simultaneous recording and reproduction system, since the width of the track moved whenever the drum rotates by 180° is 58 µm, the servo system in the existing analog SP mode using the 58 µm track can be used without any modification. Consequently, a separate servo system for processing a digital signal is not needed.

In an analog and digital combination recording and reproduction apparatus, a digital signal is recorded on or reproduced from the 29 µm tracks which is obtained by dividing the existing 58 µm width track, in order to process the digital signal. Accordingly, an enormous quantity of digital signals can be efficiently processed. In the digital signal processing for analog and digital combination video and audio signals according to the present invention, an azimuth angle difference between adjacent tracks each having the 29 µm width should be large to reduce crosstalk due to the adjacent track and to obtain clear quality picture and audio.

FIG. 2A shows the case where a difference of azimuth angles between the adjacent tracks is 24° or 36°, which represents an outstanding improvement in the crosstalk reduction compared with the case where two heads for a video signal are used to record the video signal with a 12° azimuth angle.

Meanwhile, a head drum speed or a capstan speed can be changed to make the track width of a tape into 29 µm. In this case, it is possible to record and reproduce signals using two heads identical to the VHS standard not a simultaneous multichannel recording method. That is, the EP video signal exclusive-use heads H2 and H4 or the hi-fi exclusive-use heads H5 and H6 can be used. If a digital signal is recorded using the hi-fi exclusive-use heads H5 and H6, an azimuth angle difference of 60° between the adjacent tracks is produced as shown in FIG. 2B. Accordingly, crosstalk between tracks can be minimized. Of course, since the hi-fi exclusive-use heads H5 and H6 are designed to record low-frequency (20–20 KHZ) signals, higher frequency heads can be used for improved digital recording.

Since the analog signal processing in the apparatus according to the present invention uses the existing analog recording and reproduction system, the present invention is compatible with the existing formatted VHS system. An analog signal recording and reproduction for SP and EP modes in the present invention will be described below.

Figure 3:
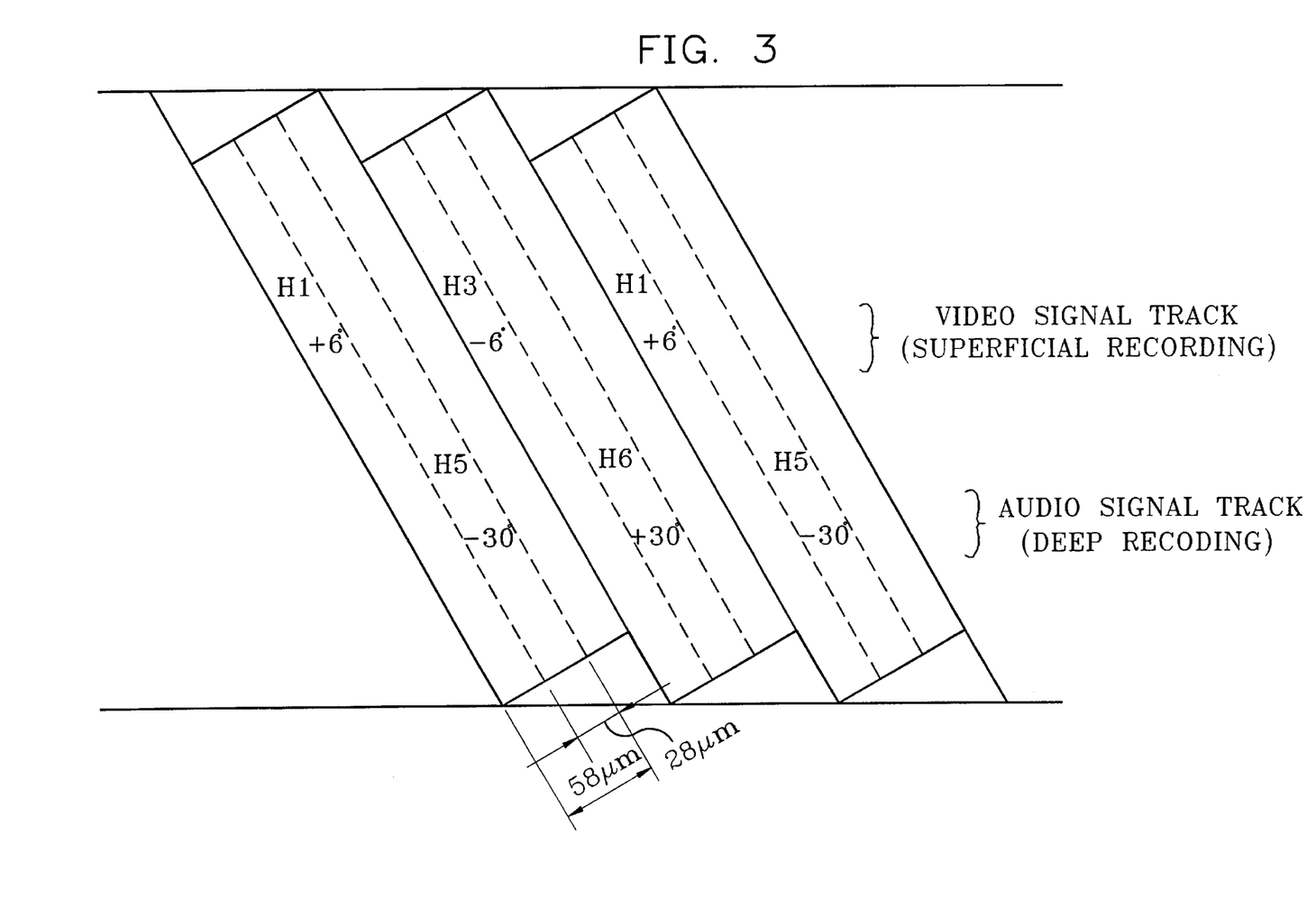
FIG. 3 is a view for explaining analog SP mode recording and reproduction in an analog and digital combination recording and reproduction apparatus according to the present invention.

FIG. 3 is a view for explaining recording and reproduction in an analog SP mode according to the present invention. In the analog SP mode, a video signal is recorded or reproduced with respect to 58 µm tracks by heads H1 and H3, so as to have an azimuth angle of +6° or −6°. A hi-fi audio signal is recorded or reproduced with respect to 28 µm central tracks by heads H5 and H6, so as to have an azimuth angle of +30° or −30°. In the analog SP mode, the video signal heads H1 and H3 are the same as the existing analog recording and reproduction heads, which scan the whole 58 µm wide track, thus leaving no guard band, (i.e., no unrecorded portion). The audio signal head has a guard band of about 30 µm. Here, the video and audio signals are multiplexed and recorded on an identical track, in which an audio signal is recorded onto a deep portion of a track and a video signal is recorded on a superficial portion of the track.

In the analog SP mode, whenever the drum rotates by 180°, the width of the track becomes 58 µm. Accordingly, both the servo system and the format of the existing analog SP mode can be naturally used. Thus, the present invention apparatus is compatible with existing VHS systems.

Figure 4:
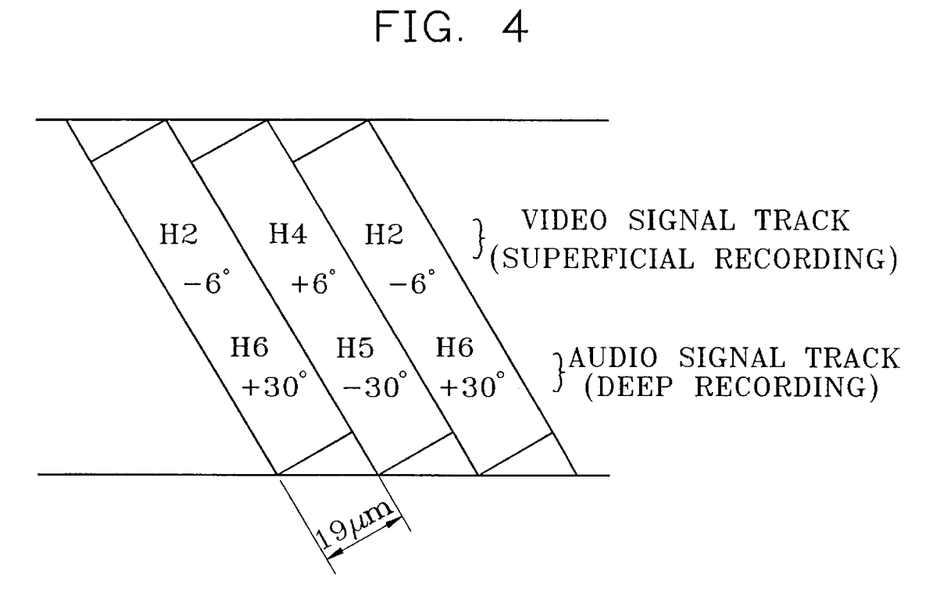
FIG. 4 is a view for explaining analog EP mode recording and reproduction in an analog and digital combination recording and reproduction apparatus according to the present invention.

FIG. 4 is a view for explaining recording and reproduction at an analog extended play (EP) mode of an analog and digital combination recording and reproduction apparatus according to the present invention. In the analog EP mode, the track width is 19 µm and the heads H2 and H4 are used for recording and reproduction of the video signal, while the heads H5 and H6 are used for recording and reproduction of a hi-fi audio signal. In the analog EP mode, whenever the drum rotates by 180°, the width of the track becomes 19 µm. Accordingly, during the signal processing in the analog EP mode according to the apparatus of the present invention, the servo system and format of the analog EP mode in the existing VHS system is used without any change. Thus, the present invention apparatus is compatible to the existing VHS systems.

Figure 5A:
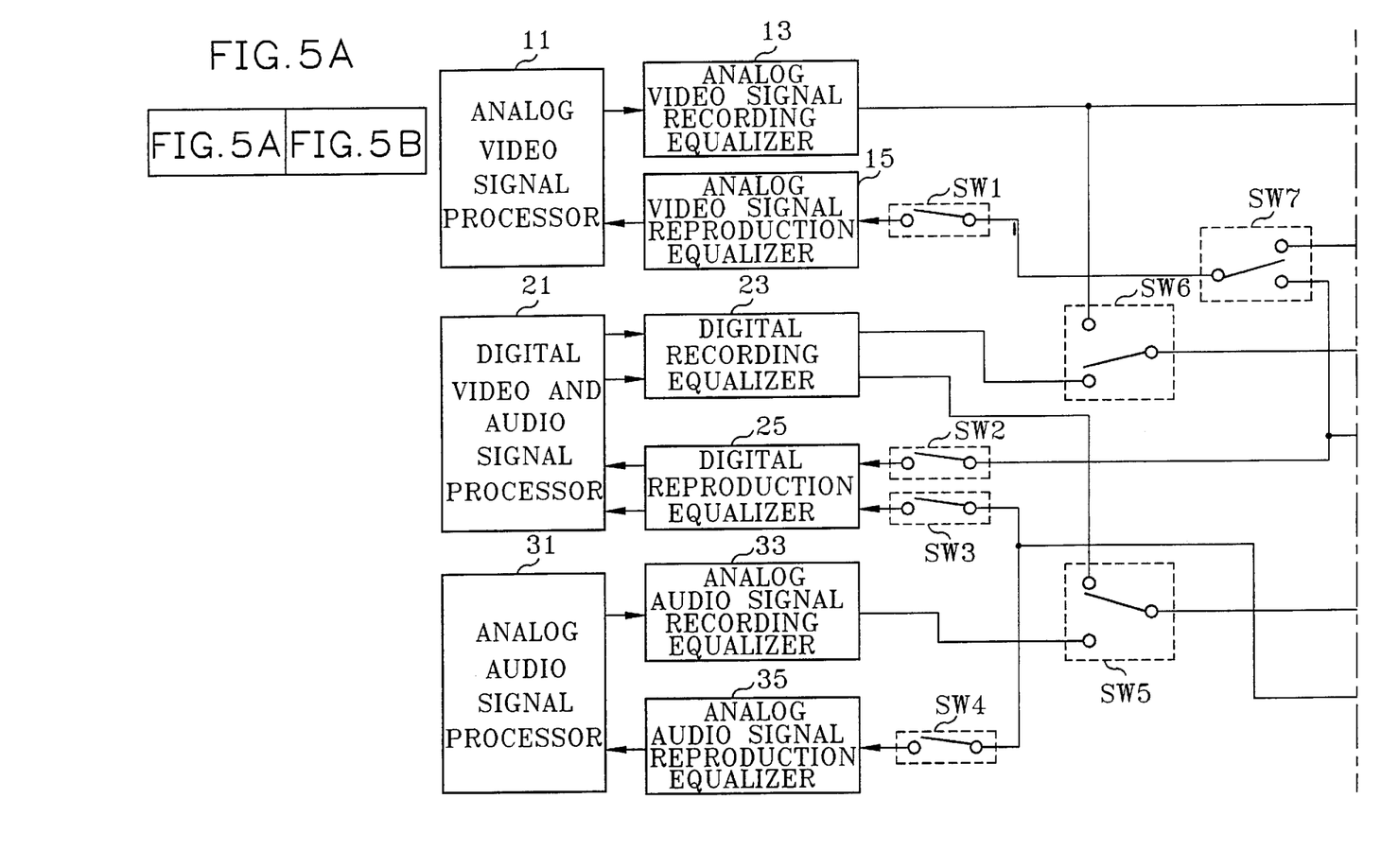
FIG. 5A is the first half of a schematic block diagram of an analog and digital combination recording and reproduction apparatus according to one embodiment of the present invention.
Figure 5B:
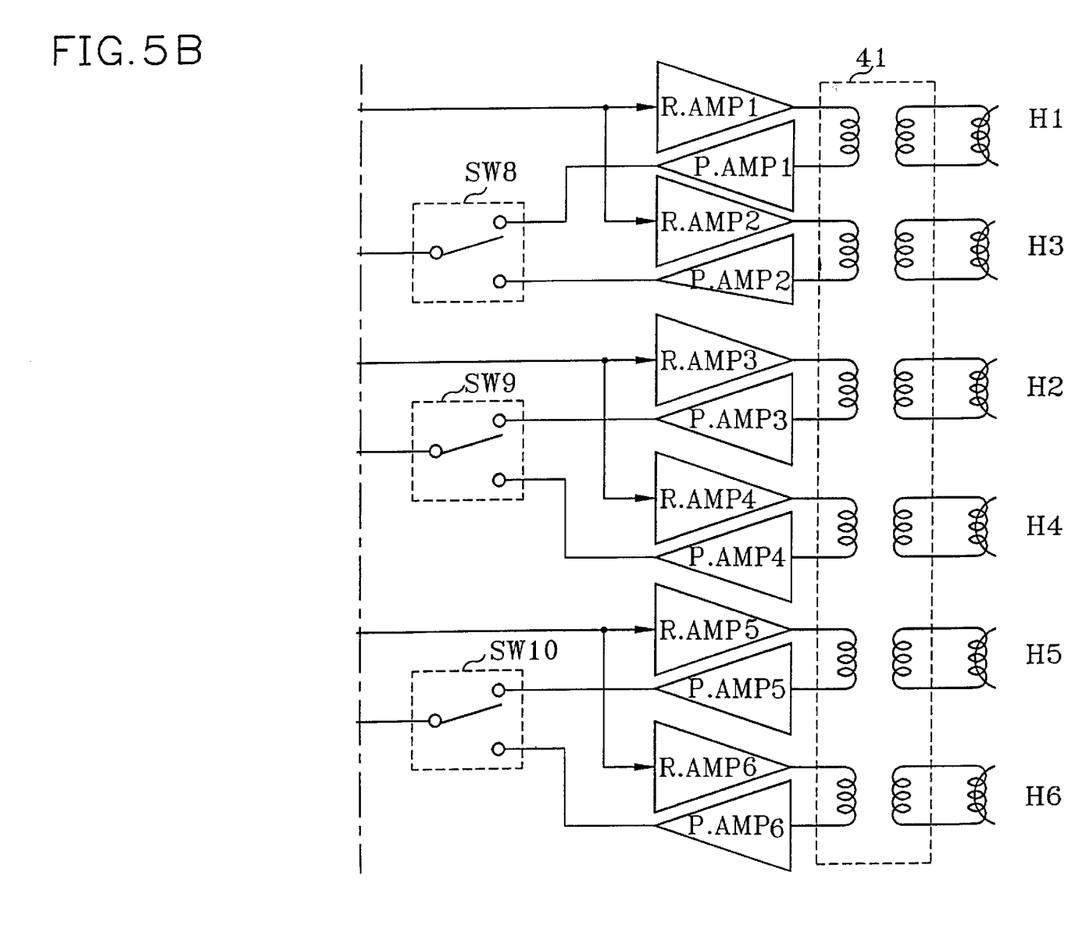
FIG. 5B is the second half of a schematic block diagram of an analog and digital combination recording and reproduction apparatus according to one embodiment of the present invention.

FIGS. 5A and 5B constitute a schematic block diagram of an analog and digital combination recording and reproduction apparatus according to a preferred embodiment of the present invention.

The apparatus shown in FIGS. 5A and 5B include an analog video signal processor 11 for processing an analog video signal, a digital video and audio signal processor 21 for processing a digital video and audio signal and an analog audio signal processor 31 for processing an analog audio signal. The analog video signal processor 11 is connected to an analog video signal recording equalizer 13 for equalizing an analog video signal for recording and an analog video signal reproduction equalizer 15 for equalizing a reproduced analog video signal. The digital video and audio signal processor 21 is connected to a digital recording equalizer 23 for equalizing digital video and audio signals for recording and a digital reproduction equalizer 25 for equalizing reproduced digital video and audio signals. The analog audio signal processor 31 is connected to an analog audio signal recording equalizer 33 for equalizing an analog audio signal for recording and an analog audio signal reproduction equalizer 35 for equalizing a reproduced analog audio signal. The apparatus shown in FIGS. 5A and 5B also includes recording amplifiers R.AMP1–R.AMP6 each for amplifying a signal to be recorded, reproduction amplifiers P.AMP1–P.AMP6 each for amplifying a reproduced signal, and a plurality of switches SW1–SW10. A rotary transformer 41 is connected between the heads H1–H6 having the same structures as those of the existing VHS type or the S-VHS type analog recording and reproduction system, and the amplifiers. The switches SW1–SW10 are controlled by a system controller (not shown) for generating various control signals necessary for recording and reproducing signals in the FIGS. 5A and 5B apparatus, which selectively outputs an input signal according to the switching of the head.

The video signal heads H1 and H3 for the SP mode of the existing analog recording and reproducing system are used for recording and reproducing a video signal in an analog SP mode, while the video signal heads H2 and H4 for the EP mode of the existing analog recording and reproduction system are used for recording and reproducing of a video signal in an analog EP mode. The video signal heads H2 and H4 and the audio signal heads H5 and H6 for the EP mode of the existing analog recording and reproduction system are used for recording and reproduction of digital video and audio signals, while the audio signal heads H5 and H6 in the existing recording and reproduction system are used for recording and reproducing an analog audio signal.

In an analog recording mode, the analog video signal processor 11 and the analog audio signal processor 31 process the analog video signal and the analog audio signal, and output the processed result to the corresponding recording equalizers 13 and 33, respectively. The analog video signal recording equalizer 13. and the analog audio signal recording equalizer 33 equalize respectively input analog video and audio signals so as to be capable of being recorded in an optimal state and output the equalized result, respectively. In case of the digital recording mode, the digital video and audio signal processor 21 processes digital video and audio signals and outputs the processed result to the corresponding recording equalizer 23, respectively.

The digital recording equalizer 23 equalizes respectively input analog video and audio signals so as to be capable of being recorded in an optimal state and output the equalized result, respectively. A fifth switch SW5 selects either the digital audio signal equalized in the digital recording equalizer 23 or the analog audio signal equalized in the analog audio signal recording equalizer 33 according to a recording mode, and outputs the selected signal. That is, the equalized analog audio signal is selected and output in the analog recording mode, while the equalized digital audio signal is selected and output in the digital recording mode. A sixth switch SW6 selects either the digital video signal equalized in the digital recording equalizer 23 or the analog video signal equalized in the analog video signal recording equalizer 13 according to a recording mode and outputs the selected signal. That is, the equalized analog video signal is selected and output in the analog recording mode, while the equalized digital video signal is selected and output in the digital recording mode. The video signal output from the analog video signal recording equalizer 13 is amplified in the amplifiers R.AMP1 and R.AMP2 by a predetermined level. The audio signal selected in the fifth switch SW5 is amplified in the amplifiers R.AMP5 and R.AMP6 by a predetermined level. The video signal selected in the sixth switch SW6 is amplified in the amplifiers R.AMP3 and R.AMP4 by a predetermined level. The amplified signal is transmitted to a corresponding head via the rotary transformer 41 and is recorded on a corresponding track in a magnetic tape.

In an analog SP mode, an analog EP mode or a digital reproduction mode, the video signals read via the heads H1 and H3 are transmitted to the reproduction amplifiers P.AMP1 and P.AMP3 via the rotary transformer 41, respectively. The reproduction amplifiers P.AMP1 and P.AMP3 amplify the input video signal by a predetermined level. An eighth switch SW8 selects one of the video signals amplified by the reproduction amplifiers P.AMP1 and P.AMP2 according to a head switching, and outputs the selected video signal. Meanwhile, the video signals read via the heads H2 and H4 are transmitted to the reproduction amplifiers P.AMP2 and P.AMP4 via the rotary transformer 41, respectively.

The reproduction amplifiers P.AMP2 and P.AMP4 amplify the input video signal by a predetermined level. A ninth switch SW9 selects one of the video signals amplified by the reproduction amplifiers P.AMP3 and P.AMP4 according to a head switching, and outputs the selected video signal. Meanwhile, the audio signals read via the heads H5 and H6 are transmitted to the reproduction amplifiers P.AMP5 and P.AMP6 via the rotary transformer 41, respectively. The reproduction amplifiers P.AMP5 and P.AMP6 amplify the input audio signal by a predetermined level. A tenth switch SW10 selects one of the audio signals amplified by the reproduction amplifiers P.AMP5 and P.AMP6 according to a head switching and outputs the selected video signal. The seventh switch SW7 selects either the video signal selected and output from the eighth switch SW8 or the video signal selected and output from the ninth switch SW9, according to the analog SP mode or the analog EP mode, and outputs the selected result. In other words, the signal selected by the eighth switch SW8, that is, the video signal read via the head H1 or H3 is selected and output in the analog SP mode, while the signal selected by the ninth switch SW9, that is the video signal read via the head H2 or H4 is selected and output in the analog EP mode. The first switch SW1 is turned on in the analog mode, and outputs the video signal selected by the seventh switch SW7 to the analog video signal reproduction equalizer 15. The second switch SW2 is turned on in the digital mode, and outputs the digital signal selected by the ninth switch SW9 to the digital reproduction equalizer 25. The third switch SW3 is also turned on in the digital mode, and outputs the digital signal selected by the tenth switch SW10 to the digital reproduction equalizer 25. The fourth switch SW4 is turned on in the analog mode, and outputs the audio signal selected by the tenth switch SW10 to the analog audio signal reproduction equalizer 35. The analog video signal reproduction equalizer 15 and the analog audio signal reproduction equalizer 35 compensate the input video and audio signals against an influence generated in the magnetic recording and reproduction system, so as to be equalized towards the identical state of the signal processed during recording. The digital reproduction equalizer 25 compensates the input video and audio signals against an influence generated in the magnetic recording and reproduction system, so as to be equalized towards the identical state of the signal processed during recording.

The analog video signal processor 11 and the analog audio signal processor 31 reproduce and process the equalized analog video and audio signals. The digital video and audio signal processor 21 reproduces and processes the equalized digital video and audio signals. The operating states of the respective switches SW1–SW10 are shown in the following Table 2.

TABLE 2

| SWITCH | ANALOG RECORDING | ANALOG REPRODUCTION | | DIGITAL RECORDING | DIGITAL REPRODUCTION |
| --- | --- | --- | --- | --- | --- |
| | | SP MODE | EP MODE | | |
| SW1 | OFF | ON | ON | OFF | OFF |
| SW2 | OFF | OFF | OFF | OFF | ON |
| SW3 | OFF | OFF | OFF | OFF | ON |
| SW4 | OFF | ON | ON | OFF | OFF |
| SW5 | DOWN | OFF | OFF | UP | OFF |
| SW6 | UP | OFF | OFF | DOWN | OFF |
| SW7 | OFF | UP | DOWN | OFF | OFF |
| SW8 | OFF | Switching | OFF | OFF | OFF |
| SW9 | OFF | OFF | Switching | OFF | Switching |
| SW10 | OFF | Switching | Switching | OFF | Switching |

As described above, the analog and digital combination recording and reproduction apparatus does not use only the head structure and arrangement of the existing analog recording and reproduction apparatus, but also uses the existing analog recording and reproduction system according to the VHS standard. The analog and digital combination recording and reproduction apparatus is compatible to a VCR of the existing analog type VHS or S-VHS. Also, the present invention provides a track structure capable of improving a crosstalk and efficiently recording an enormous quantity of digital signals since the azimuth angle difference between the adjacent tracks is large. The present invention provides a simple and inexpensive analog and digital combination recording and reproduction apparatus, in which a recording and reproduction system is shared when an analog signal and a digital signal are processed.

While only certain embodiments of the invention have been specifically described herein, it will be apparent to skilled artisans that numerous modifications may be made thereto without departing from the spirit and scope of the invention.

What is claimed is:

1. An analog and digital combination recording and reproduction apparatus capable of recording and reproducing video and audio signals in at least one analog mode and at least one digital mode, said apparatus comprising:

a magnetic tape;

analog video and audio signal processing means for performing recording and reproduction of analog video and audio signals;

digital video and audio signal processing means for performing recording and reproduction of digital video and audio signals;

a plurality of heads each of which has a structure and an arrangement for recording and reproducing analog video and audio signals with respect to said magnetic tape; and switching means for transmitting signals between said heads and said analog and digital processing means, according to said analog and digital modes, wherein said plurality of heads are used for transferring digital video and audio signals in said digital mode.

2. The analog and digital combination recording and reproduction apparatus according to claim 1, wherein said apparatus is capable of defining tracks of different widths on said magnetic tape, said tracks including analog tracks for recording and reproducing analog video and audio signals according to an analog standard play mode, and digital tracks for recording and reproducing digital signals, said digital tracks being obtained by dividing each analog track by a predetermined number of times.

3. The analog and digital combination recording and reproduction apparatus according to claim 2, wherein said digital tracks are obtained by bisecting said analog tracks.

4. The analog and digital combination recording and reproduction apparatus according to claim 1, wherein said analog video and audio signal processing means comprises an analog video and audio signal equalizer.

5. The analog and digital combination recording and reproduction apparatus according to claim 1, wherein said digital video and audio signal processing means comprises a digital video and audio signal equalizer.

6. The analog and digital combination recording and reproduction apparatus according to claim 1, wherein said plurality of the heads are video signal heads and audio signal heads for use in an analog standard play mode and an analog extended play mode.

7. The analog and digital combination recording and reproduction apparatus according to claim 6, wherein said video signal heads and said audio signal heads for the analog extended mode are used for recording and reproduction of the digital video and audio signals.

8. The analog and digital combination recording and reproduction apparatus according to claim 7, wherein said video signal heads and said audio signal heads alternately perform a recording and reproduction operation with respect to said magnetic tape.

9. The apparatus according to claim 1, wherein said plurality of heads includes:

at least two standard play (SP) heads and at least two extended play (EP) heads as video heads; and at least two audio heads.

10. The apparatus according to claim 9, wherein said EP heads are used for transferring analog signals in an analog EP mode, and digital signals in said digital mode.

11. The apparatus according to claim 9, wherein said audio heads are used for transferring analog audio signals in analog SP and EP modes, and digital signals in said digital mode.

* * * * *